No. 661,116. Patented Nov. 6, 1900.
W. L. DANNAHOWER.
HOT WATER HEATER.
(Application filed June 10, 1899.)
(No Model.) 4 Sheets—Sheet 1.
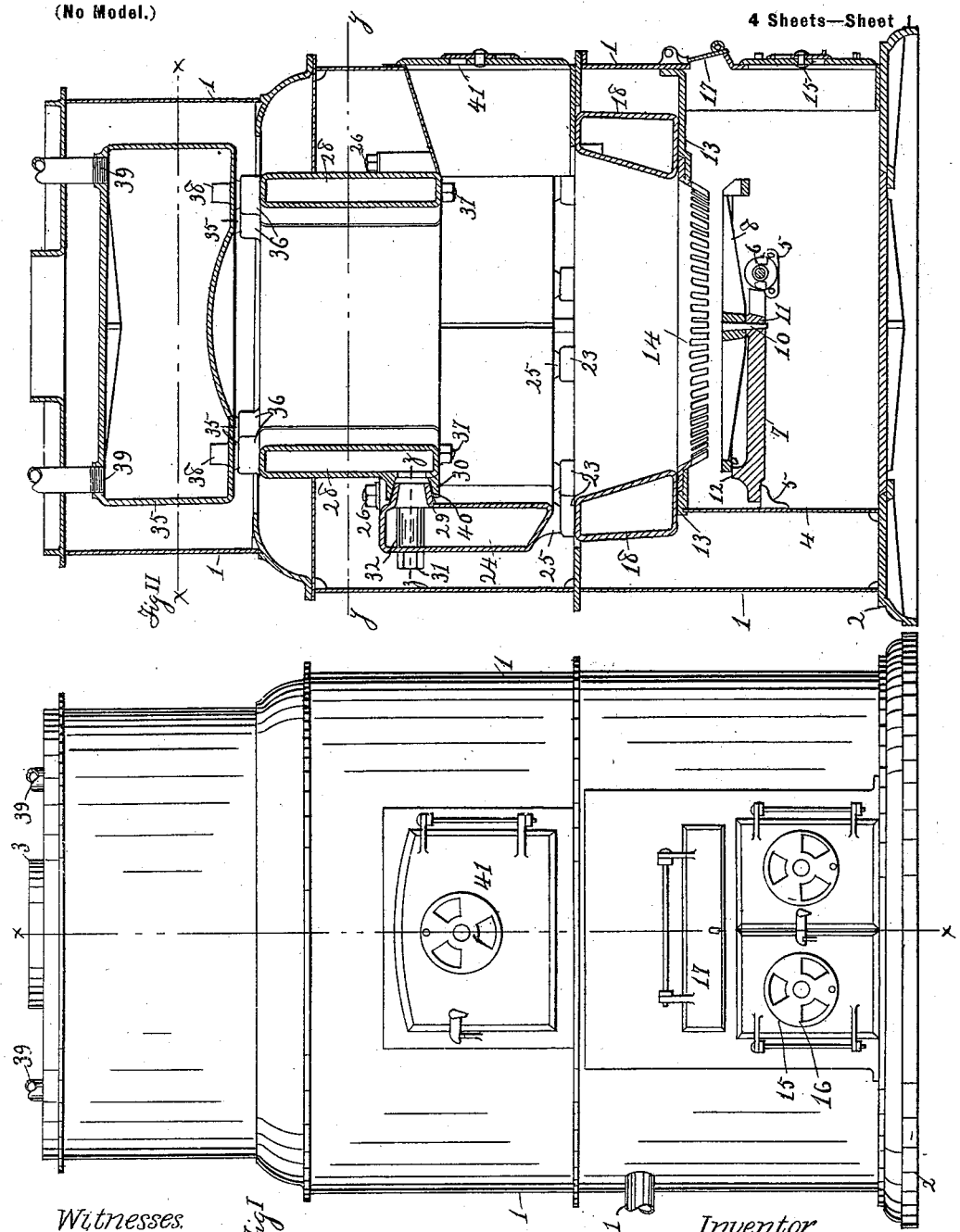
Witnesses.
Inventor.
W. L. Dannahower
By
J. S. Brown.
Att'y.

No. 661,116. Patented Nov. 6, 1900.
W. L. DANNAHOWER.
HOT WATER HEATER.
(Application filed June 10, 1899.)
(No Model.) 4 Sheets—Sheet 2.
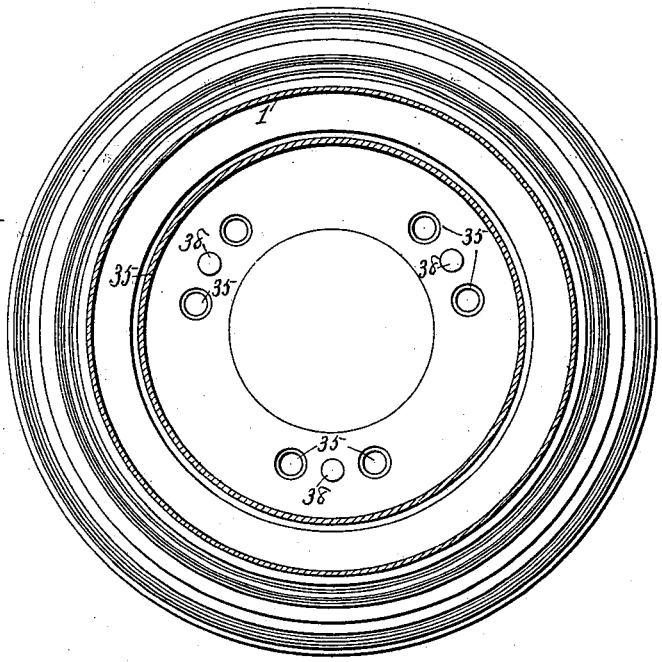
Fig III
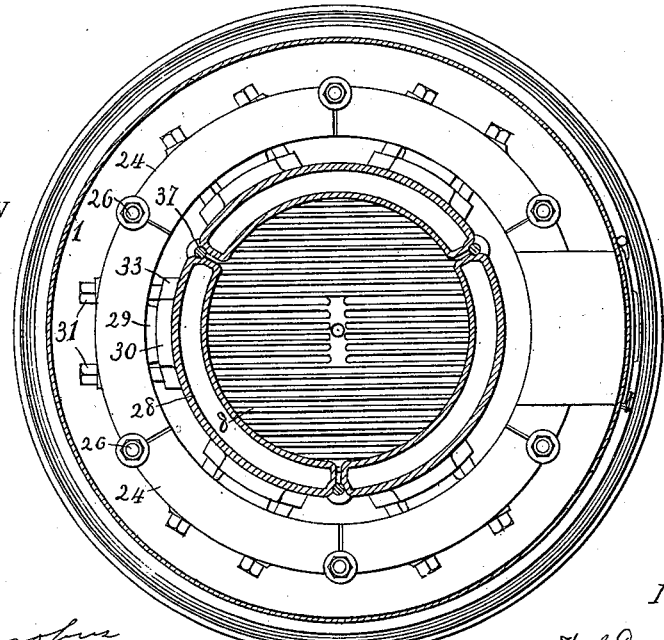
Fig IV
Witnesses
A. B. Jacobus
M. A. Clarke
Inventor
W. L. Dannahower
By
J. S. Brown
Atty.

No. 661,116. Patented Nov. 6, 1900.
W. L. DANNAHOWER.
HOT WATER HEATER.
(Application filed June 10, 1899.)
(No Model.) 4 Sheets—Sheet 3.
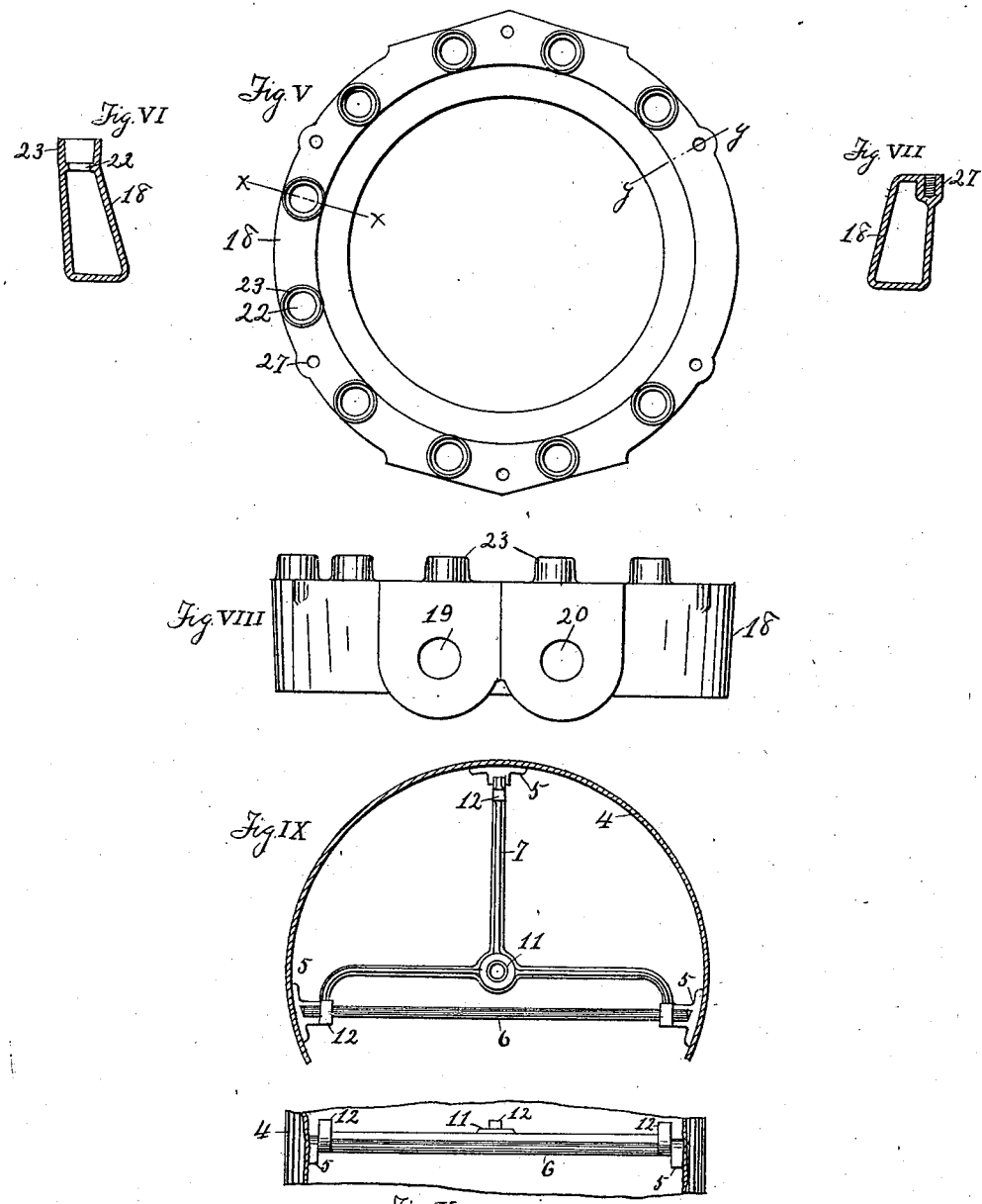

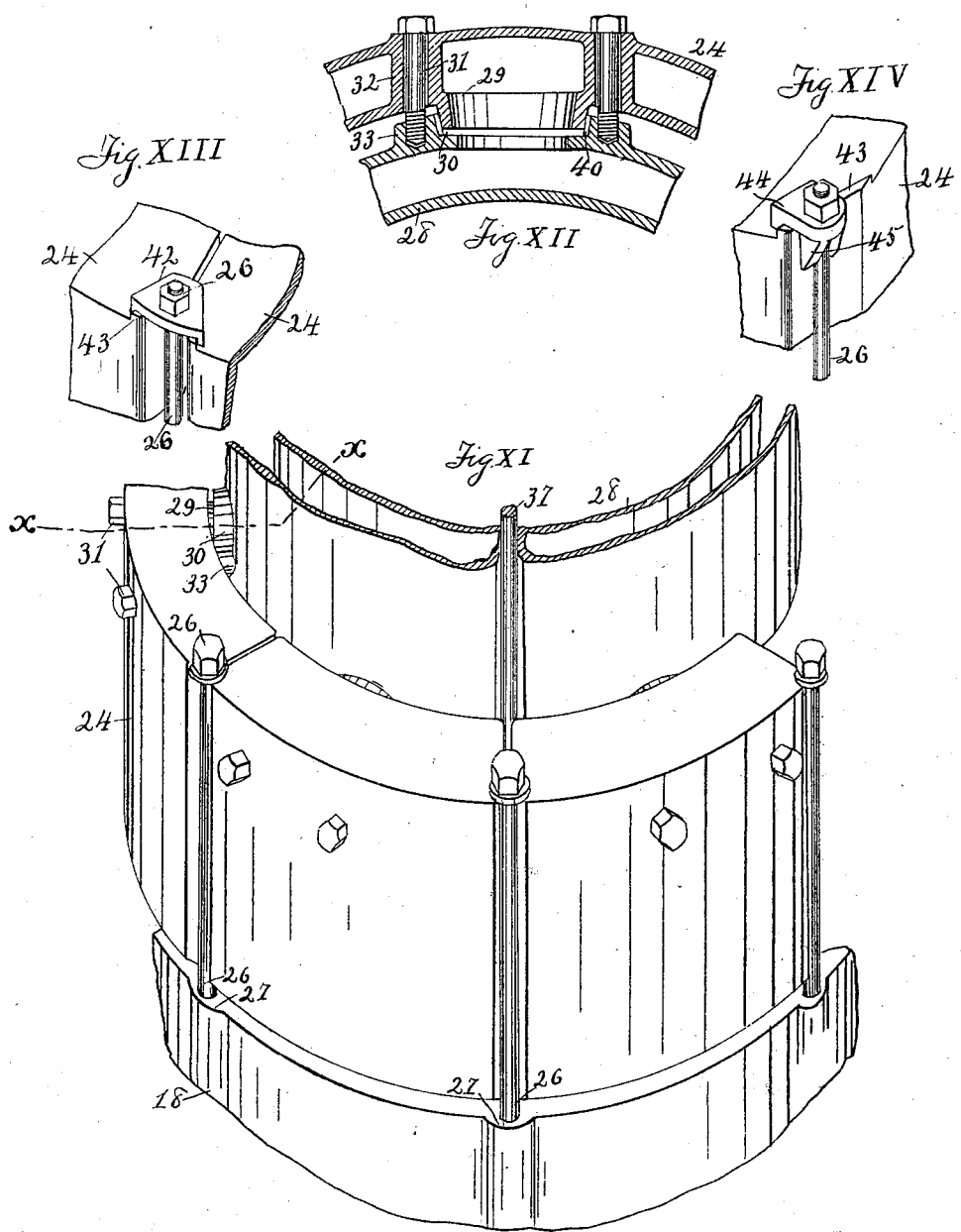

United States Patent Office.

WILLIAM L. DANNAHOWER, OF KANSAS CITY, MISSOURI.

HOT-WATER HEATER.

SPECIFICATION forming part of Letters Patent No. 661,116, dated November 6, 1900.

Application filed June 10, 1899. Serial No. 720,007. (No model.)

*To all whom it may concern:*

Be it known that I, WILLIAM L. DANNAHOWER, a citizen of the United States, residing at Kansas City, in the county of Jackson, in the State of Missouri, have invented certain new and useful Improvements in Hot-Water Heaters, of which the following is a full, clear, and exact description, reference being had to the accompanying drawings, which form a part of this specification.

My invention relates to improvements in hot-water heaters for heating rooms and buildings, having more particular reference to the construction, arrangement, and combinations of devices to form a heater to heat the water to be conducted by suitable pipes through the rooms or building for warming and heating the same; and my invention consists in certain features of novelty hereinafter described, and pointed out in the claims.

Figure I represents an elevation of a hot-water heater embodying my invention. Fig. II represents a vertical cross-section on the line $x\ x$ of Fig. I. Fig. III represents a horizontal cross-section on the line $x\ x$ of Fig. II. Fig. IV represents a horizontal cross-section on the line $y\ y$ of Fig. II. Fig. V represents a plan view of the fire-bowl of the heater. Fig. VI represents a cross-section of the same on the line $x\ x$ of Fig. V. Fig. VII represents a cross-section of the same on the line $y\ y$ of Fig. V. Fig. VIII represents a side elevation of the same. Fig. IX represents a plan view of the grate-rocker. Fig. X represents a side elevation of the same. Fig. XI represents a detail isometric view showing the manner in which the communicating water-chambers are connected. Fig. XII represents a detail cross-section on the line $x\ x$ of Fig. XI or $z\ z$ of Fig. II, showing the construction and arrangement for securing the water-chambers together. Fig. XIII represents a detail view showing the means for securing in position the segments of the water-chamber section above the fire-bowl. Fig. XIV represents a detail view showing the means for securing in position the segments of the water-chamber section above the fire-bowl next to the fuel-opening.

Similar numerals refer to similar parts throughout the several views.

1 represents a casing forming the envelop or principal heating-chamber, resting upon a base 2 and provided at the top with the collar 3, arranged to carry a smoke-pipe.

4 represents an inner casing resting also on the base and forming the ash-pit and also serving to support the water-chambers above it. 5 represents lugs on said casing arranged to carry the grate-rocker, the rock-shaft 6 and the arm 7 of said rocker resting on said lugs. The grate 8 is pivotally mounted on said rocker by the pivot-pin 10, passing through the hub 11 thereof, the rim of the grate resting on the lugs 12 thereon. On said casing 4 is provided a plate 13, having a central annular opening and connected at the front with the outer casing and forming the bed-plate for the water-chambers. On said plate is mounted the annular serrated rim 14 of the fire-bowl.

15 represents the doors of the ash-pit, provided with the draft-regulators 16.

17 represents a draft-door opening into the ash-pit.

18 represents an annular water-chamber mounted on the bed-plate 13 and forming the fire-bowl of the furnace. Said water-chamber is provided with the inlet-openings 19 and 20 in the sides thereof near the bottom, (see Fig. VIII,) with which are connected the circulating-pipes, one of which is shown at 21. Said water-chamber is also provided on its upper side with the openings 22, surrounded by the collars 23.

24 represents a second annular water-chamber located immediately over the water-chamber 18 and communicating therewith through the collars 25 on the bottom thereof, which are arranged to fit closely within the collars 23 and form a water-tight connection between the two chambers, said collars supporting the water-chamber 24 sufficiently above the chamber 18 to permit the draft and heat from the fire to pass out between them, so that chamber 24 is on both its outer and inner side subjected to the heat from the fire. Said water-chamber 24 is preferably formed in segmental sections, as shown in Figs. IV and XI, as by such construction and arrangement the connections can be more securely fitted and there is less danger of disarrangement through contraction and expansion, and said chamber is secured upon said chamber 18 by the bolts 26, threaded into enlargements 27 (see Fig. VII) of the wall of chamber 18 and provided with suitable binding-washers engaging the upper face of chamber 24.

28 represents a third annular water-chamber formed also preferably in segmental sections, partly telescoping with water-chamber 24 and communicating therewith through the collars 29 on the inner side of chamber 24 engaging the collars 30 on the outer side of chamber 28, said collars separating said chambers sufficiently for the draft and heat to pass between them, so that both sides of chamber 28 are subjected to the heat from the fire, and the two chambers are secured together by bolts 31, passing through sleeves 32, formed integral with the walls of chamber 24, and engaging threaded bosses 33 on the wall of chamber 28, as shown in detail in Fig. XII. 34 represents the uppermost or top water-chamber, supported upon the water-chamber 28 and communicating therewith through the collars 35 on chamber 34 engaging collars 36 on chamber 28 and secured thereon by bolts 37, threaded into bosses 38 on the bottom plate of chamber 34 and provided with suitable washers engaging the under side of chamber 28. 39 represents circulating or service pipes communicating with said chamber 34 and leading to suitable radiators in the rooms or building to be heated. Two such pipes are shown, though it is apparent that any desired number may be used. Between said collars, as hereinbefore described, there may be used, if so desired, a packing 40, of asbestos or like material, to insure the connection being made water-tight.

41 represents a feed-door in the casing 1 for the admission of fuel to the fire-bowl, one of the sections of the water-chamber 24 being omitted to give access thereto.

In bolting down the sections of chamber 24 by the bolts 26 upon the fire-bowl 18 I preferably use the flanged washer 42, (shown in Fig. XIII,) the flange on the washer engaging a bead or rib 43 on the margin of the upper face of the section. By such an arrangement of flanged washer engaging a bead or rib on the section the sections are held more securely together and prevented from spreading, and to secure the ends of the sections next the space provided for access to the fire-bowl I provide the washer shown at 44 in Fig. XIV, having a flange engaging the rib 43 on the margin of the upper face of the section and depending lug or lugs 45 bearing against the lateral face of the section.

The advantages of this construction are obvious in the large vertical heating-surface presented to the action of the fire without interference with the draft and the relatively small horizontal surfaces presented for the deposition of soot and ashes, which seriously interfere with the heating. And, again, by the arrangement of the water-chambers the heat is applied to both sides of the chambers, and the water therein being in a thin body exposed over a large vertical area on both sides to the heating-surface is very quickly heated and the heat maintained with a minimum amount of fuel. An important advantage is also apparent in the sectional formation of the water-chambers 24 and 28, in that if one of said sections becomes damaged it may be removed and replaced without interfering with the other sections or other parts of the heater.

Having thus fully described my improvements, what I claim as my invention, and desire to secure by Letters Patent, is—

1. In a hot-water heater the combination with an annular water-chamber forming the fire-bowl of the heater, of an annular water-chamber composed of vertically-arranged independent segmental sections supported upon and each section having independent communication with said fire-bowl water-chamber, an annular water-chamber composed of vertically-arranged independent segmental sections telescoping with said last-mentioned water-chamber, and each section having independent communication with a corresponding section of said chamber, and a water-chamber mounted upon said last-mentioned chamber, and with which each section of said chamber has independent communication; substantially as set forth.

2. In a hot-water heater the combination with an annular water-chamber forming the fire-bowl of the heater, and provided with openings in its upper face, and collars surrounding said openings, of an annular water-chamber composed of vertically-arranged independent segmental sections supported upon said fire-bowl water-chamber, each section communicating independently with said fire-bowl water-chamber through suitable openings, and collars surrounding said openings arranged to engage and interlap with the collars on said chamber, an annular water-chamber composed of vertically-arranged independent segmental sections telescoping with said last-mentioned water-chamber, each section secured to and communicating independently with a corresponding section thereof through suitable openings in the opposing faces, and collars formed on the opposing faces surrounding said openings and arranged to interlap to form a water-tight passage, and a water-chamber mounted upon said last-mentioned chamber, and with which each section of said chamber communicates independently through suitable openings in the opposing walls, and collars formed on the opposing walls surrounding said openings and arranged to interlap to form water-tight passages, substantially as set forth.

3. In a hot-water heater the combination with an annular water-chamber forming the fire-bowl of the heater, and a water-chamber forming the top of the heater, of intermediate annular water-chambers composed of independent, vertically-arranged telescoping segmental sections communicating through suitable openings independently with each other and with the lower and upper chambers respectively, and collars on the opposing faces surrounding said openings and arranged to engage and interlap to form water-tight passages; substantially as set forth.

4. In a hot-water heater, an annular water-chamber composed of independent, vertically-arranged segmental sections, a bead or rib formed on the contiguous upper margin of said sections, and a flanged washer arranged to engage said bead or rib to hold said sections in position when bolted down; substantially as set forth.

5. In a hot-water heater of the class described, an annular water-chamber composed of independent, vertically-arranged segmental sections, an annular water-chamber composed of independent, vertically-arranged segmental sections telescoping with said water-chamber, independent communication between each outer section and a corresponding inner section through openings in the opposing walls, collars formed on the opposing walls surrounding said openings and arranged to engage and interlap to form water-tight passages, cored sleeves in the water-space of the outer sections for the passage of binding-bolts, binding-bolts passing through said sleeves, and threaded bosses on the outer face of the inner sections with which said binding-bolts engage; substantially as set forth.

6. In a hot-water heater, the combination with an annular water-chamber forming the fire-bowl of the heater, and a water-chamber forming the top of the heater, of intermediate annular water-chambers formed of independent, vertically-arranged, telescoping, segmental sections, communicating through suitable openings, independently with each other and with said lower and upper water-chambers respectively; substantially as set forth.

7. In a hot-water heater comprising a series of superposed water-chambers, the upper communicating with the lower through suitable openings, collars on the opposing faces surrounding said openings, and arranged to interlap to form water-tight passages; substantially as set forth.

WILLIAM L. DANNAHOWER.

Witnesses:
W. F. BRADBURY,
JOHN M. PARRY.